US006990575B2

(12) United States Patent
Bautz et al.

(10) Patent No.: US 6,990,575 B2
(45) Date of Patent: Jan. 24, 2006

(54) APPARATUS AND PROCESS FOR A STARTING A DATA PROCESSING INSTALLATION

(75) Inventors: Gerd Bautz, Bergkamen (DE); Juergen Moschner, Dortmund (DE); Guy Coen, Aalst (BE)

(73) Assignee: Siemens Aktiengesellschaft, Munich (DE)

(*) Notice: Subject to any disclaimer, the term of this patent is extended or adjusted under 35 U.S.C. 154(b) by 646 days.

(21) Appl. No.: 09/976,432

(22) Filed: Oct. 11, 2001

(65) Prior Publication Data

US 2002/0073307 A1 Jun. 13, 2002

(30) Foreign Application Priority Data

Oct. 12, 2000 (DE) ................................ 100 50 604

(51) Int. Cl.
*G06F 15/177* (2006.01)

(52) U.S. Cl. ................................................ 713/2; 713/1

(58) Field of Classification Search .................... 713/1, 713/2; 710/8

See application file for complete search history.

(56) References Cited

U.S. PATENT DOCUMENTS

| | | | | | |
|---|---|---|---|---|---|
| 5,793,943 | A | | 8/1998 | Noll | |
| 5,951,685 | A | | 9/1999 | Stancil | |
| 5,954,685 | A | | 9/1999 | Tierney | |
| 6,058,048 | A | * | 5/2000 | Kwon | 365/185.33 |
| 6,112,303 | A | | 8/2000 | Stancil | |
| 6,128,732 | A | * | 10/2000 | Chaiken | 713/2 |
| 6,172,936 | B1 | * | 1/2001 | Kitazaki | 365/233 |
| 6,272,628 | B1 | * | 8/2001 | Aguilar et al. | 713/2 |
| 6,330,622 | B1 | * | 12/2001 | Schaefer | 710/8 |
| 6,415,387 | B1 | * | 7/2002 | Aguilar et al. | 713/320 |
| 6,490,677 | B1 | * | 12/2002 | Aguilar et al. | 713/1 |
| 6,516,359 | B1 | * | 2/2003 | Kurihara et al. | 710/52 |
| 6,591,362 | B1 | * | 7/2003 | Li | 713/1 |
| 6,601,167 | B1 | * | 7/2003 | Gibson et al. | 713/2 |
| 6,785,807 | B1 | * | 8/2004 | Aguilar et al. | 713/2 |
| 6,795,912 | B1 | * | 9/2004 | Itoh et al. | 713/2 |

FOREIGN PATENT DOCUMENTS

EP 0 959 405 11/1999

OTHER PUBLICATIONS

XP-002263835—Alessandro Rubini, Kernel Korner Booting the Kernel pp. 1-7.

* cited by examiner

*Primary Examiner*—Chun Cao
(74) *Attorney, Agent, or Firm*—Bell, Boyd & Lloyd LLC

(57) ABSTRACT

A process for starting a data processing installation, and associated components, wherein program commands of a bootstrap program are stored in a bootstrap memory unit and, when executing the bootstrap program, a processor controls the transfer of program commands from a reload memory unit to a main memory unit and, after the transfer operation, execution of the program commands stored in the main memory unit during the transfer operation is started, the bootstrap memory unit and/or the reload memory unit being serial-access memory units which are less expensive than memory units used previously.

14 Claims, 2 Drawing Sheets

APPARATUS AND PROCESS FOR A STARTING A DATA PROCESSING INSTALLATION

BACKGROUND OF THE INVENTION

The present invention relates to a process in which a bootstrap program is stored in a bootstrap memory unit. A processor executes the program commands of the bootstrap program and in so doing controls a transfer operation. During the transfer operation, program commands are transferred from a reload memory unit to the main memory unit. After the transfer operation, the processor starts executing the commands stored in the main memory during the transfer operation.

Processes for starting a data processing installation are also referred to as bootstrap processes or boot processes. In known processes such as are customary in personal computers, the bootstrap program is stored in a ROM (Read Only Memory). The bootstrap program is part of the "BIOS" (Basic Input Output System). The ROM store permits parallel access to the bit positions of a data word having a number of bits. During the start operation, the processor of the data processing installation executes the commands of the bootstrap program stored in the ROM. In this context, it gains read access to the ROM storage unit. During the start operation, the operating system is copied from the reload memory unit to the main memory unit.

The reload memory unit is a memory unit which stores data even after the operating voltage has been turned off; i.e., a "nonvolatile" memory unit. The reload memory unit used is, by way of example, a "hard disk" storing several hundred megabytes or several gigabytes.

The main memory unit is a memory unit which loses its stored data after the operating voltage has been turned off; i.e., a "volatile" memory unit. The main memory unit used is RAM (Random Access Memory). The fact that the main memory unit loses its stored data when turned off means that, after turning on, the operating system needs to be transferred to the main memory unit again. The main memory unit also has a shorter access time than the reload memory unit. Hence, for the data processing installation to operate rapidly, the operating system likewise needs to be transferred from the reload memory unit to the main memory unit.

It is an object of the present invention to specify, for starting a data processing installation, a simple process which can be performed using reduced component complexity. In addition, the aim is to specify an associated data processing installation, an associated control unit and an associated program.

SUMMARY OF THE INVENTION

The present invention is based on the consideration that a memory unit for parallel access to the stored data or to data which are to be stored needs to have a multiplicity of connections. This makes the component comparatively large and requires that it take up a relatively large amount of physical space on a printed circuit board or on a chip. By contrast, a memory unit with serial access to the data is of simpler design and requires fewer connections; for example, only two voltage connections, a control connection and a connection for data input and output. As such, serial memory units are less complex to manufacture than memory units with parallel access. The reduced number of connections allows the amount of physical space required also to be less.

In the case of the inventive process, the bootstrap memory unit and/or the reload memory unit is, therefore, a serial-access memory unit or a memory unit which requires a number of read operations in order to read a program command. Such a practice allows memory units which are simple to manufacture and can be manufactured at low cost to be used for the memory units. In the text below, serial access also relates to multiple access for reading a program command. If the reload memory unit is a serial-access memory unit, then a parallel-access memory unit can be used for storing the bootstrap program, as is customary to date. The expenditure on components to be used is reduced further, however, if both the bootstrap memory unit and the reload memory unit are serial-access memory units.

On the other hand, a serial-access memory unit also can be used just for the bootstrap memory unit in order to use the inventive effects. The reload memory unit used, as previously, may be a parallel-access memory unit; e.g., a hard disk.

In one embodiment of the inventive process, the bootstrap memory unit used is a serial-access memory unit. A processor is thus not able to execute the program stored in the bootstrap memory unit directly. In the case of the development, therefore, in a bootstrap transfer operation, the program commands of the bootstrap program are transferred from the bootstrap memory unit to the main memory unit using a control circuit. After the bootstrap transfer operation, the processor starts executing the program commands transferred to the main memory unit during the bootstrap transfer operation, and hence starts the reload transfer operation.

In a subsequent embodiment, the control unit is a binary control unit in which the control function is prescribed by the interconnection of logic circuits. The control function is thus not prescribed by a program which needs to be executed by a processor. To perform the functions of the control unit, large-scale-integrated user-specific circuits are used. In the case of "ASICS" (user-specific IC) and FPGAs, logic circuit elements of the circuit are interconnected in a programming operation as prescribed by the user. The user-specific circuits used are PLDs (Programmable Logic Device), PLAs (Programmable Logic Array), PAL (Programmable Array Logic). The control unit is of simple design as compared with a microprocessor, however.

In an embodiment, during the bootstrap operation, the control unit keeps the processor in a state in which it executes no commands. This can be achieved by permanently applying a reset signal to the reset input of the processor. Another option is to interrupt the clock generation for the processor. In the case of this development, the control unit enables commands to be executed after the bootstrap transfer operation is complete. Execution can be enabled by switching over the reset signal.

In another embodiment, the bootstrap memory unit is a nonvolatile memory unit. As already mentioned, the bootstrap memory unit used can be a serial memory unit; i.e., a memory unit in which the bit positions for a program command are output successively bit by bit. In one refinement, the storage capacity of the bootstrap memory unit is chosen to be much lower than the storage capacity of the reload memory unit. Thus, the storage capacity of the bootstrap memory unit is in the kilobyte range. As bootstrap memory unit, serial-access EEPROMs (Electrical Erasable Programmable Read Only Memory) are suitable; such circuits operate with an IIC bus system, for example.

In yet another embodiment, the main memory unit is a volatile memory unit. The main memory unit permits simultaneous input or output of a number of bit positions of a program command. As such, a processor can access the main memory unit directly. The main memory unit used can be a RAM (Random Access Memory). Synchronously operating dynamic RAMs permit short access times.

In a further embodiment, the reload memory unit is a nonvolatile memory unit. Reload memory units which output the stored program commands serially can be used. In one development, the storage capacity of the reload memory unit is in the megabyte range. The reload memory unit can, therefore, store operating systems having several hundred megabytes. In one refinement, the reload memory unit used is a "multimedia card". To access such cards, a protocol needs to be observed which the processor does not control and which uses specific control commands. The control commands include data words whose bits stipulate the command to be executed. The commands have been standardized by the MMC agreement (Multi Media Card).

A Compact Flash card and/or a SmartMedia card and/or a Memory Stick memory unit (e.g., from Sony) are also used, however. Some of these storage media output, by way of example, four bits in parallel, so that a number of read operations are required in order to access a program command having more than the bit positions respectively output in parallel.

In a subsequent embodiment, the reload memory unit contains a register in which the start address of a currently readable memory area of the reload memory unit is noted. Another memory area, whose start address is currently not noted in the register, cannot be read. When the bootstrap program is executed, the reload transfer operation is executed on the basis of the start address; i.e., only the data words stored in the readable memory area are accessed. The use of, by way of example, multimedia cards having such registers allows another memory area to be stipulated easily; namely, by entry of another start address in the register.

In one embodiment, the simple selection option for memory areas in the reload memory unit is utilized in order to update program commands. A new version of the program commands can be stored in the currently unreadable memory area. If the data processing installation needs to be restarted during the storage operation, the restart operation can be performed irrespective of the state of the memory for the new version. This is because the old version still exists in full in the reload memory unit. Only after the new version of the program commands has been fully transferred to the reload memory unit is the address which is noted in the register set to the other memory area. A new start operation is then initiated. If errors arise during this start operation, the old start address is entered in the register again. Starting is then repeated. In the memory unit, the previously used, tried-and-tested program commands are then used for the new start operation. This measure can prevent the data processing installation from being unavailable for a relatively long time when changing to a new version of the program commands. This is particularly necessary for telecommunications installations or for exchanges, because high demands are placed on the failure reliability thereof.

In another embodiment, at least once during execution of the program commands transferred to the main memory unit, at least one portion of these program commands is copied from an original area in the main memory unit to another area of the main memory unit. A jump command can be used to make the processor start executing the program commands stored in the other memory area. Commands to be transferred from the reload memory unit are then stored in the original area, where they overwrite the previously stored program commands. After the current transfer operation, the processor is then switched to a defined initial state; e.g., using the control unit. This measure ensures that, after the transfer process is complete or after a portion of the transfer process is complete, execution of the program commands transferred during the transfer process can be started easily. This is because such a defined initial state has been prescribed for commercially available processors. By way of example, this initial state is adopted when a reset signal is produced. In the initial state, the registers of the processor have prescribed values, and command execution starts at an address prescribed by the manufacturer of the processor. Complex measures for prescribing register contents and processing areas can thus be avoided.

In one embodiment of the inventive process, the reload memory unit stores program commands using a compression process. The use of a compression process allows the memory space required in the reload memory unit to be considerably reduced. By way of example, only less than one third of the memory space is now required. Program commands for carrying out the associated decompression process can be stored in the bootstrap memory unit or in an uncompressed portion of the program commands in the reload memory unit. When the program commands of the decompression process are executed, the compressed program commands are decompressed.

In one embodiment, after the bootstrap transfer operation, the bootstrap program is copied over within the main memory unit. The bootstrap program is then executed, the original area being overwritten by program commands from the reload memory unit. The processor is then put into a defined state for the second time. The program commands transferred previously from the reload memory area then start to be executed; e.g., execution of the operating system is started.

In another embodiment, the processor is put into a defined state three times during the restart operation. Firstly after the bootstrap transfer operation, after an auxiliary load transfer operation in which the decompression program is transferred, and then at the end of the reload transfer process for starting the operating system. This practice makes it a simple matter to switch between the individual stages.

The present invention also relates to a data processing installation having at least one processor, a bootstrap memory unit, a reload memory unit and having a main memory unit. The bootstrap memory unit and/or the reload memory unit is a memory unit with serial data access or a memory unit which requires a number of read operations in order to read a program command. In developments, the data processing installation is designed such that, when it is operating, the inventive process or one of its developments is performed. Hence, the technical effects mentioned above also apply to the data processing installation.

The present invention also relates to a circuit arrangement, e.g. a userspecific circuit (ASIC), which is required as a control unit when performing a start operation including a serial memory unit. In one embodiment, the circuit arrangement is designed such that, when it is operating, the inventive process or one of its developments is performed. The technical effects mentioned above also apply to the circuit arrangement.

The present invention also relates to the use of a serial-access memory unit as a memory for program data in a start operation for a data processing installation. In particular, multimedia cards and the other cards mentioned above and the Memory Stick memory unit have to date been used only for storing music data or voice data, but not for storing program data. The technical effects mentioned above also apply to the use of the serial memory unit.

Additional features and advantages of the present invention are described in, and will be apparent from, the following Detailed Description of the Invention and the Figures.

DETAILED DESCRIPTION OF THE INVENTION

Figure 1:
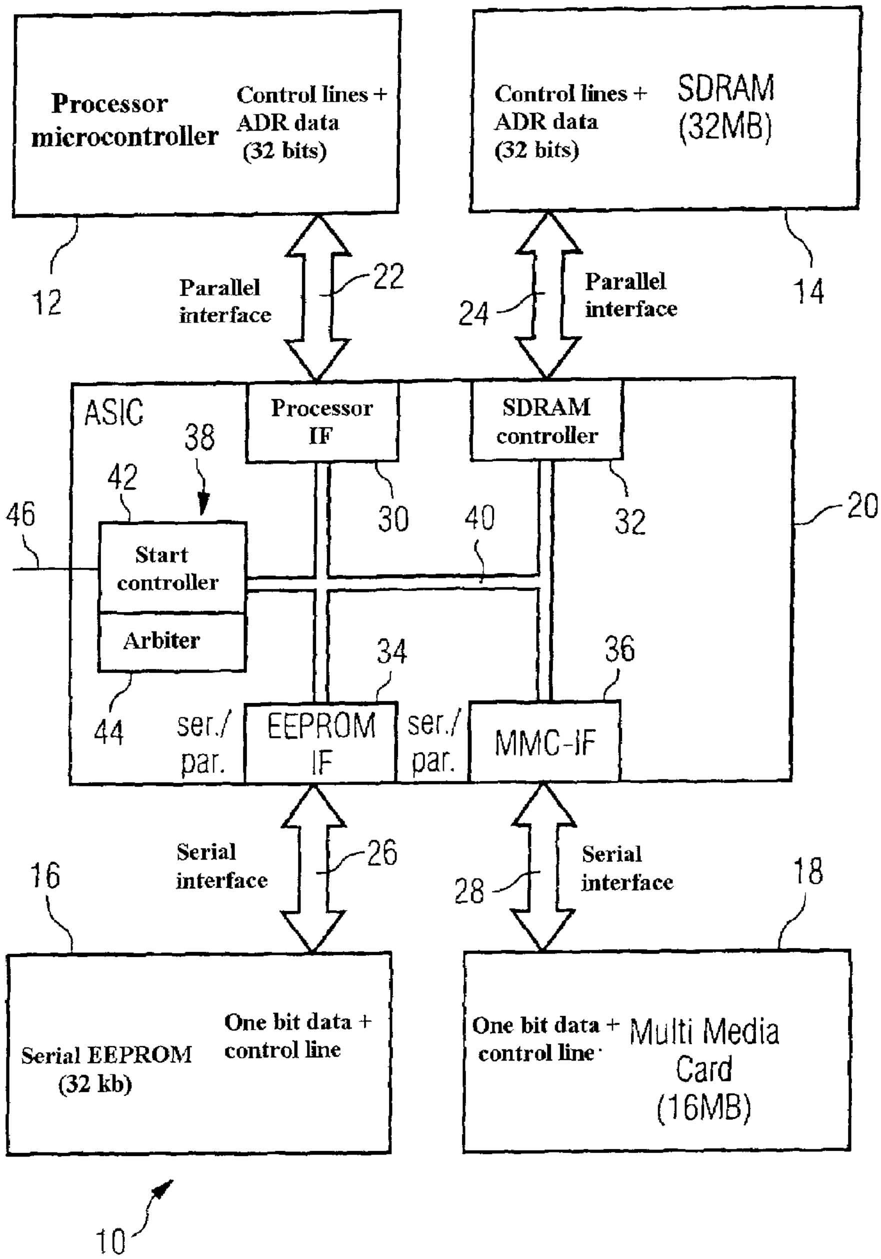
FIG. 1 shows circuit units required for the start operation in a data processing installation.

FIG. 1 shows circuit units used for the start operation in a data processing installation 10. These circuit units include a processor 12, a main memory 14, a bootstrap memory 16, a reload memory 18 and an ASIC 20. The processor 12 is a microcontroller, e.g. of the "Coldfire" type, as manufactured by MOTOROLA. A bus system 22 connects the processor 12 to the ASIC 20. The bus system 22 contains, like the processor 12, thirty-two data lines, a number of control lines and a multiplicity of address lines.

The main memory 14 is a commercially available SDRAM (Synchronous Dynamical Random Access Memory). A bus system 24 connects the main memory 14 to the ASIC 20. The bus system 24 contains a number of data lines, e.g. sixteen data lines, a number of control lines and a multiplicity of address lines. The main memory 14 has a storage capacity of 32 megabytes, for example.

The bootstrap memory 16 is a serial EEPROM having a storage capacity of, by way of example, 32 kilobytes; for example, an EEPROM from PHILIPS with an IIC bus system. The bootstrap memory 16 contains a bootstrap program. A bus system 26 connects the bootstrap memory 16 to the ASIC 20. The bus system 26 contains just one control line and a line for data transfer.

The reload memory 18 contains a multimedia card having a storage capacity of 16 megabytes, for example. By way of example, a multimedia card from SCANDISC is used. The reload memory 18 stores the operating system; e.g., the WINDOWS operating system. The reload memory 18 is connected to the ASIC 20 via a serial interface 28 containing seven lines, one line of which is used for transferring the data.

The ASIC 20 contains a processor interface unit 30 for connecting the bus system 22, a controller unit 32 for connecting the bus system 24, a bootstrap memory interface unit 34 for connecting the IIC bus, and a reload memory interface unit 36 for connecting the serial interface 28. The ASIC 20 also contains a control unit 38. The interface units 30, 34 and 36, the controller unit 32 and the control unit 38 are connected inside the ASIC 20 via an internal bus system 40.

The processor interface 30 forms the interface between the bus system 22 and the internal bus system 40. The internal bus system essentially corresponds to the bus system 22, wherein only small signal adjustments need to be made in the interface unit 30.

The controller unit 32 forms the interface between the bus system 24 and the internal bus system. In addition, the controller unit 32 is used for synchronizing the read and write access operations on the main memory 14.

The bootstrap memory interface 34 connects the IIC bus system 26 to the internal bus system 40. The interface unit 34 contains a serial/parallel data converter, which produces data words from the bits coming from the bootstrap memory 16 and forwards them to the internal bus system 40. The interface unit 34 also contains a register for storing data words transferred via the internal bus system 40. On the basis of the content of these data words, control signals for controlling the read operation of the bootstrap memory 16 are produced on the control line of the bus system 26.

The interface unit 36 connects the serial interface 28 to the internal bus system. The interface unit 36 contains a serial/parallel data converter which is used to convert data arriving via the interface 28 into data words having a prescribed number of bit positions; e.g., having 32 bit positions.

The control unit 38 contains a start controller 42 and a bus access circuit 44. The start controller 42 is connected to a reset line 46. If a reset signal is produced on the reset line 46, the start controller 42 starts to control a start operation, which is explained in more detail below with reference to FIG. 2. The bus access circuit 44 ensures that there are no conflicts during access by the units connected to the internal bus system 40.

Figure 2:
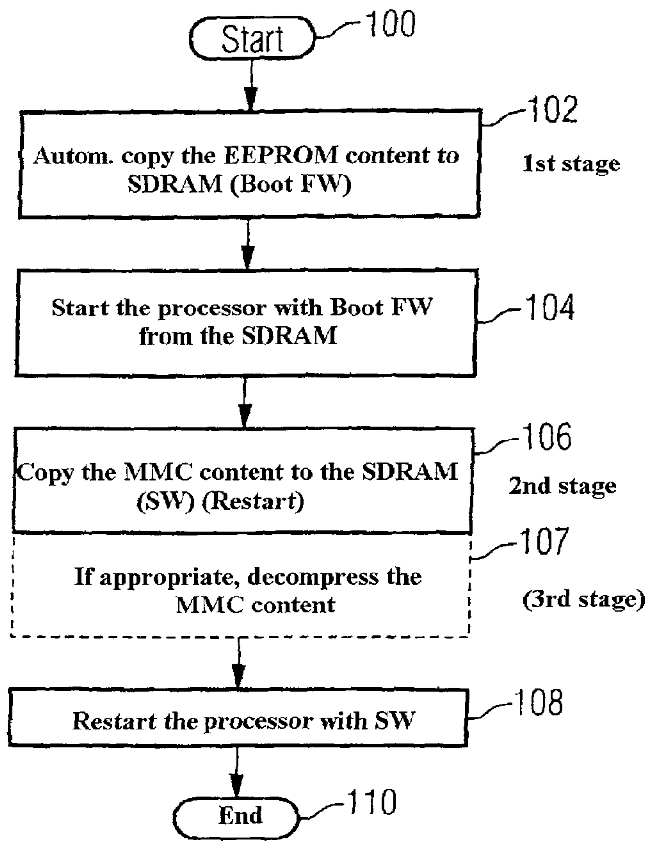
FIG. 2 shows a flowchart containing process steps for restarting the data processing installation.

FIG. 2 shows a flowchart containing process steps which are performed when the data processing installation 10 is restarted; see also FIG. 1. The process starts in a process step 100 with the production of a reset pulse on the reset line 46.

In a subsequent process step 102, the start controller 42 uses the bootstrap memory interface unit 34 to copy the bootstrap program's program commands stored in the bootstrap memory 16 into the main memory 14 automatically. The program commands are stored in the main memory 14 starting from the initial address zero and continuing in rising address values. The first stage of restarting the data processing installation 10 forms a bootstrap transfer operation in which a bootstrap program stored in the bootstrap memory 16 is transferred to the main memory 14.

In a process step 104, the start controller 42 deactivates the reset input of the processor 12 in order to prompt the processor 12 to change from a reset state (Reset) to a normal mode of operation. In process step 104, the processor 12 obtains read access to the main memory 14 via the bus system 22, the internal bus system 40 and the bus system 24. When the bootstrap program is executed, dynamic data can be stored in the main memory 14. When the bootstrap program's commands are executed, the bootstrap program's program commands are first copied from the initial area of the main memory 14 to the final area of the main memory 14. The processor then uses a jump command to execute commands starting from an address in the final area. When these commands are executed, the operating system is transferred to the main memory 14 via the serial interface 28, the internal bus system 40 and the bus system 24.

The operating system 18 is stored in the main memory 14 starting from the initial address in the main memory; see process step 106. Process step 106 forms a second stage of the start operation. The second stage is also referred to as the reload transfer operation. In a process step 108 following process step 106, the start controller 42 sets the processor 12 to the reset state and prompts it to start executing commands at the beginning of the main memory 14 again. This invokes the operating system of the data processing installation 10; e.g., the WINDOWS operating system. The process for restarting the data processing installation is complete in a process step 110.

In another exemplary embodiment, the operating system is stored in the reload memory 18 in compressed form. The reload memory 18 also stores a decompression program. Process steps 100 to 104 are thus executed as in the first exemplary embodiment. In process step 106, however, the decompression program is copied from the reload memory 18 into the main memory 14; specifically, starting at the beginning of the main memory 14. Next, in a process step 107 following process step 106, the processor 12 is reset by the start controller 42.

The processor 12 then starts again to execute commands from the initial address in the main memory 14. Upon execution of these program commands, the decompression program is copied from the initial area of the main memory 14 into the final area thereof. On the basis of a jump command after this copying operation, the processor 12 continues to execute commands in the final area of the main memory 14. When the decompression program's commands are executed, in a process step 107, the compressed operating system is read from the reload memory 18, is decompressed and is stored in uncompressed form in the main memory 14 starting at the initial address thereof. Copying the operating system is a third stage of the restart operation.

Process step 107 is followed by process step 108 in the manner explained above. In process step 110, the process for restarting the data processing installation 10 is then terminated.

Figure 3:
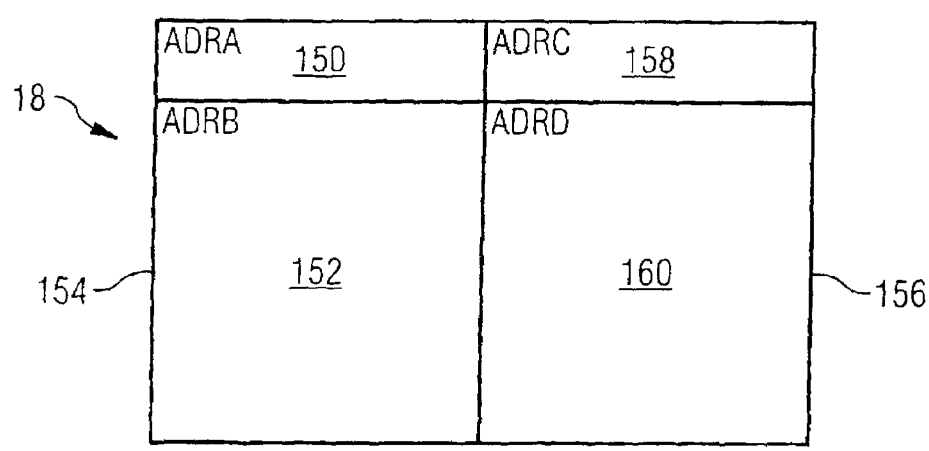
FIG. 3 shows memory areas in a reload memory.

FIG. 3 shows memory areas in the reload memory 18, as are used in a third exemplary embodiment. A decompression area 150 stores the decompression program in uncompressed form, starting from an address ADRA. In an operating system area 152 following the decompression area 150, the operating system is stored in compressed form starting at an address ADRB. The decompression area 150 and the operating system area 152 form a selection area 154. Specifying the address ADRA in a register of the reload memory 18 selects the selection area 154 as the active memory area. Program commands can be read from the currently active memory area. By contrast, a selection area 156 cannot be read without changing the content of the register. The selection area 156 contains a decompression area 158 for storing a later version of the decompression program. The decompression area 158 starts at an address ADRC. The decompression area 158 is followed by an operating system area 160 at an address ADRD. The operating system area 160 is likewise in the selection area 156 and is used for holding a new version of the operating system in compressed form.

If a new version of the operating system is intended to be used on the data processing installation 10, the selection area 154 first of all remains active. Via remote data transfer or via local data transfer, e.g. from a drive in the data processing installation 10, the same decompression program as in the decompression area 150 is stored in the decompression area 158. If a later version of the copying program is available, then the later version is stored in the decompression area 158. Next, the later version of the operating system is stored in compressed form in the operating system area 160. After this storage operation, the address ADRC is entered in the register of the reload memory 18 as the start address of the active area. Hence, the selection area 156 is now active. The selection area 154 is no longer active; i.e., program commands can no longer be read from it. Next, a reset pulse is produced on the reset line 46. The restart process explained above with reference to FIG. 2 is performed, with the selection area 156 being accessed. In this context, process step 107 is also performed. If no errors arise when the restart operation is performed, the program commands stored in the selection area 154 can be erased.

If, by contrast, an error arises when the process steps are performed for the restart operation, the register content of the reload memory 18 is altered. The address ADRA is entered again; i.e., there is a switch to the selection area 156 again. Next, a reset pulse is supplied to the reset line 46, and the data processing installation is restarted in the manner explained above. On another data processing installation, the error is sought in the program code of the operating system's compression program and is removed. The corrected program is then transferred to the decompression area 156 or to the operating system area 160. After that, there is a switch to the selection area 156 and a restart operation is performed, in the manner explained above with reference to FIG. 3.

Although the present invention has been described with reference to specific embodiments, those of skill in the art will recognize that changes may be made thereto without departing from the spirit and scope of the invention as set forth in the hereafter appended claims.

What is claimed is:

1. A process for starting a data processing installation, the process comprising the steps of:

storing program commands of a bootstrap program in a bootstrap memory unit;

transmitting the program commands of the bootstrap program, in a bootstrap transmission process, from the bootstrap memory unit into an initial area of a main memory unit using a control circuit;

copying the program commands of the bootstrap program, via a processor, from the initial area into an end area of the main memory unit;

starting execution of the program commands transmitted into the main memory unit, via the processor, during the bootstrap transmission process wherein a reload transfer operation is executed for transmitting program instructions from a reload memory unit into the initial area of the main memory unit;

wherein at least one of the bootstrap memory unit and the reload memory unit is one of a serial-access memory unit and a memory unit which requires a plurality of read access operations in order to read a program command for the processor.

2. A process for starting a data processing installation as claimed in claim 1, wherein the control unit is at least one of a binary control unit in which the control function is prescribed by the interconnection of logic circuits, and held in a user-specific, integrated circuit in which logic circuit elements have been interconnected as prescribed by a user in a programming operation.

3. A process for starting a data processing installation as claimed in claim 1, the process further comprising the steps of:

keeping the processor in a reset state in which no commands are executed, during the bootstrap transfer operation and via the control unit; and enabling execution of commands, via the control unit, after the bootstrap transfer operation by switching over a reset signal.

4. A process for starting a data processing installation as claimed in claim 1, the process further comprising at least one of the following steps:

outputting bit positions, via the bootstrap memory unit, of its stored program commands serially or using a plurality of read operations per program command; and defining the bootstrap memory to be an EEPROM.

5. A process for starting a data processing installation as claimed in claim 1, the process further comprising at least one of the following steps:

allowing simultaneous input and output, via the main memory unit, of a plurality of bit positions of a program command; and defining the main memory unit as a synchronously operating dynamic RAM.

6. A process for starting a data processing installation as claimed in claim 1, the process further comprising at least one of the following steps:

outputting, via the reload memory unit, bit positions of its stored program commands serially or using a plurality of read operations per program command;

defining the storage capacity of the reload memory unit to be greater than 4 megabytes; and incorporating into the memory unit at least one of a "multimedia card", a Compact Flash card, a SmartMedia card, and a Memory Stick memory unit.

7. A process for starting a data processing installation as claimed in claim 1, wherein the reload memory unit contains a register in which a start address of one currently readable memory area from at least two memory areas of the reload memory unit is noted, such that, when the bootstrap program is executed, the transfer operation is executed based on the start address.

8. A process for starting a data processing installation as claimed in claim 7, the process further comprising the step of:

replacing the program commands in the reload memory unit by storing a new version of the program commands in the currently unreadable memory area of the reload memory unit, noting in the register the address of the other memory area, initiating a new start operation, re-entering into the register the value entered before the other memory area was set in the event of errors occurring, and initiating a start operation again.

9. A process for starting a data processing installation as claimed in claim 1, the process further comprising the steps of:

changing the address of at least one portion of the program commands, at least once during execution of the program commands transferred to the main memory unit, the program commands being moved from their original memory area in the main memory unit to another memory area of the main memory unit;

starting execution of the program commands, via the processor, stored in the other memory area;

controlling the transfer of program commands, via the processor, in the reload memory unit to the original area; and switching the processor to a defined initial state, after the transfer operation, by switching over the reset signal.

10. A process for starting a data processing installation as claimed in claim 1, the process further comprising the steps of:

compressing the program command stored in the reload memory unit using a compression process;

storing a decompression process in one of a portion of the program commands in the bootstrap memory unit and an uncompressed portion of the program commands in the reload memory unit; and compressing the compressed program commands when the program commands for the decompression process are executed.

11. A process for starting a data processing installation as claimed in claim 9, the process further comprising the steps of:

storing the program commands for the decompression process in the bootstrap memory unit;

setting the processor, after the bootstrap transfer operation, to the defined initial state;

changing the address of at least one portion of the bootstrap program before the reload transfer operation by copying the at least one portion;

storing program commands in the original address range as part of the reload transfer operation; and setting the processor, after the reload transfer operation, to the defined initial state.

12. A process for starting a data processing installation as claimed in claim 9, the process further comprising the steps of:

storing the program commands for the compression process in the reload memory unit;

setting the processor, after the bootstrap transfer operation, to the defined initial state;

changing the address of at least one portion of the bootstrap program before the reload transfer operation by copying the at least one portion;

storing program commands for the decompression process in the original address range in a first phase of the reload transfer operation;

setting the processor, after the first phase of the reload transfer operation, to the defined initial state;

changing the address of at least one portion of the program commands for the decompression process by copying the at least one portion;

storing program commands of an operating system, in a second phase of the reload operation, in the original address range; and setting the processor, after the second phase of the reload operation, to the defined initial state again.

13. A data processing installation, comprising:

a processor for executing program commands;

a bootstrap memory unit for storing a bootstrap program;

a reload memory unit for storing program commands; and a main memory unit including an initial area to which the bootstrap program is transferred and to which program commands from the reload memory unit are transferred using the bootstrap program before execution by the processor, wherein said main memory unit further includes an end area to which program commands of the bootstrap program are copied from the initial area;

wherein at least one of the bootstrap memory unit and the reload memory unit is one of a memory unit with serial data access and a memory unit which requires a plurality of read access operations in order to read a program command for the processor; and a control unit which operates without a program and, when the data processing installation is turned on, transfers the bootstrap program from the bootstrap memory unit to the main memory unit, the bootstrap memory outputting bit positions of the program commands of the bootstrap program serially or using a plurality of read operations per program command.

14. A circuit arrangement, comprising:

an interface to a processor, the processor for executing program commands;

an interface to one of a bootstrap memory unit with serial data access and a bootstrap memory unit which requires a plurality of read access operations in order to read a program command for the processor, the bootstrap memory unit for storing a bootstrap program;

an interface to one of a reload memory unit with serial data access and a reload memory unit which requires a plurality of read access operations in order to read a program command for the processor the reload memory unit for storing program commands;

an interface to a main memory unit with parallel data access for reading a program command, wherein the bootstrap program is transferred from the bootstrap memory to an initial area of the main memory unit, and program commands from the reload memory unit are transferred to the main memory unit using the bootstrap program before execution by the processor, and program commands of the bootstrap program are copied from the initial area to an end area of the main memory unit; and a control unit which in response to a start signal, prompts a bootstrap transfer operation for transferring program commands for the processor from the bootstrap memory unit to the main memory unit, and which, after the bootstrap transfer operation, prompts the processor to execute the program commands transferred to the main memory unit, and which permits a reload transfer operation in which program commands are transferred from the reload memory unit to the main memory unit.

* * * * *